(12) United States Patent
Chang et al.

(10) Patent No.: US 7,203,697 B2
(45) Date of Patent: Apr. 10, 2007

(54) FINE-GRAINED AUTHORIZATION USING MBEANS

(75) Inventors: David Yu Chang, Austin, TX (US); Vishwanath Venkataramappa, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/732,756

(22) Filed: Dec. 10, 2003

(65) Prior Publication Data

US 2005/0131994 A1 Jun. 16, 2005

(51) Int. Cl.
*G06F 17/30* (2006.01)

(52) U.S. Cl. .................................... 707/102
(58) Field of Classification Search ............ 707/1–10, 707/100–104.1, 200–206, 120, 136; 709/203, 709/222, 2; 718/100; 719/313
See application file for complete search history.

(56) References Cited

U.S. PATENT DOCUMENTS 5,911,143 A 6/1999 Deinhart et al.

OTHER PUBLICATIONS

Stephane Frenot et al., Open-service-platform instrumentation: JMX management over OSGI, 2004, ACM Press, NY, NY, pp. 199-202.*
John Corwin et al, MJ: a rational module system for Java and its applications, (Oct. 2003), ACM Press, NY, NY, pp. 241-254.*
Eammon McManus, Eamons mcManus's Blog, Adding descriptors to MBeans in TIger, Jun. 8, 2006, Internet: http://weblogs.java.net/blog, pp. 1-9.*
U.S. Patent Application entitled "Fine-Grained Authorization By Authorization Table Associated With A Resource," filed herewith, David Yu Chang, et al.
U.S. Patent Application entitled "Fine-Grained Authorization by Traversing Generational Relationships," filed herewith, David Yu Chang, et al.
Longhua Zhang, et al., A Rule-Based Framework for Role-Based Delegation, SACMAT'01, May 3-4, 2001, Chantilly, Virginia, USA, pp. 153-162.
Mohammed A. Al-Kahtani, et al., Induced Role Hierarchies with Attribute-Based RBAC, SACMAT'03, Jun. 1-4, 2003, Como, Italy, pp. 1-7.
Longhua Zhang, et al., A Rule-Based Framework for Role-Based Delegation and Revocation, ACM Transactions on Information and System Security, vol. 6, No. 3, Aug. 2003, pp. 404-441.

* cited by examiner

*Primary Examiner*—Diane Mizrahi
(74) *Attorney, Agent, or Firm*—David A. Mims, Jr.; Schubert Osterrieder & Nickelson PLLC (57) ABSTRACT

Methods, systems, and media are disclosed for managing a resource managed by a mbean server having an mbean. One embodiment includes receiving a request by the application, wherein the request constitutes an action a user seeks to perform on the resource, and adding a number of instance identifier fields to an mbean descriptor file associated with the mbean. Further, the embodiment includes populating the number of instance identifier fields with an equivalent number of properties from an objectname of the resource, thereby producing a populated mbean descriptor file that identifies the resource among resources. Further still, the embodiment includes reading the mbean descriptor file after the populating, and determining, based on the reading, whether the user has an authority to perform the request. If authority exists, then an mbean method performs the action on the resource, and filters the obtained results to coincide with the user's authority.

20 Claims, 4 Drawing Sheets

FINE-GRAINED AUTHORIZATION USING MBEANS

FIELD OF INVENTION

The invention generally relates to managing resources by an application having mbeans. More particularly, the invention relates to methods, systems, and media for managing a resource by adding and populating resource instance identifiers fields with properties to uniquely identify a resource among resources, invoking, provided the user has authority, an mbean method to perform a user's requested action on the resource, and optionally filtering the results from the invoked mbean method to ensure the user has the authority to receive any or all of the results.

BACKGROUND

In a Java™ application server environment, users may manage resources, such as nodes (i.e., computer systems), servers, applications, and clusters (i.e., collection of application servers), belonging, for example, to an organization, by logging onto a network in communication with the resources. Typically, the logon requires a security process, such as verification of a user identifier and password, before a user can access the resources. After network verification, the user has access to all the resources on the network.

Before conducting any resource management, such as stopping and starting a server, tuning a server, reading a log file on a node, and so forth, the application may also require a security process for a user to log into the application. The security process may be the same or similar to the user identifier and password required for logging onto the network. Now, after verification, the user has access to all the resources, which the user may manage in an unfettered manner.

However, organizations may hesitate at granting unfettered access to users for managing resources on the network in order to prevent security breaches, such as infiltration and corruption, as well as to ensure proper management, such as configuration, administration, operation, and monitoring of the resources. To restrict access, additional security processes are implemented. Implementing additional processes requires additional constraints placed on both the user and/or the resource. These additional constraints are collectively termed "fine-grained authorization," as opposed to the "coarse-grained authorization," or generalized authorization, described above in terms of verification of user identifier and password. Solutions for providing restricted access have relied upon, for example, conventional role and policy based authorization systems in order to determine whether a user has access rights to perform a requested action on a particular resource before allowing the user to perform the requested action, i.e., attempt to manage the resource.

Turning now to discussion of the Java™ application server environment, Java Management Extension ("JMX™") provides a set of remote application programmer interfaces (APIs) for managing and monitoring remote resources. A managed application server systems, such as an mbean server application, incorporates the JMX APIs, and provides a set of mbeans, an abbreviation for management beans comprising small pieces of JAVA™ code, to perform the management operations on the resource, wherein the operations comprise a set of actions. Before invoking an mbean method to perform any action on a resource instance, the aforementioned authority for the user to perform the requested action is required to ensure the user has such authority.

Prior solutions sometimes use one mbean for each resource instance, and viewed in combination with whether a user has an authority to perform the requested action on a resource, then a one-to-one relation exists between mbeans and authority checks; therefore, a thousand files of authority to mbean invocation methods for a thousand resources—a horrendous scalability issue for a large organization. Further, even if reduction of the scalability issue results by providing only one mbean for each resource type, such as servers, nodes, etc., then identity of multiple instances of a resource is unsolved, whether or not the user has access or not to perform the requested action on the resource. By using one mbean for each resource type, and providing methods, systems, and media for uniquely identifying each resource type, followed by checking for authorization to perform the requested action on the uniquely identified resource, then fine-grained authorization occurs with simultaneous optimization of scalability, and therein, reduction of storage requirements for implementation of the fine-grained authorization.

SUMMARY OF THE INVENTION

Embodiments of the invention generally provide methods, systems, and media for managing a resource managed by an mbean server application having an mbean. In one embodiment, the method generally includes receiving a request by the mbean server application, wherein the request comprises an action a user seeks to perform on the resource, and adding a number of instance identifier fields to an mbean descriptor file associated with the mbean. Further, the method includes populating the number of instance identifier fields with an equivalent number of properties from an objectname of the resource, thereby producing a populated mbean descriptor file that identifies the resource among resources. Further still, the method includes reading the populated mbean descriptor file, and determining, based on the reading, whether the user has an authority to perform the request.

In another embodiment, the invention provides a system for managing a resource managed by an mbean server application having an mbean. The system includes an input module for receiving a request from a user in order to perform an action on a resource. Further, the system includes an addition module for adding a number of instance identifier fields to an mbean descriptor file associated with the mbean, and a population module for populating the number of instance identifier fields with an equivalent number of properties from an objectname of the resource, thereby producing a populated mbean descriptor file that identifies the resource among resources. Further still, the system includes a reader module for reading the populated mbean descriptor file, and a decision module for determining whether the user has an authority for performance of the action on the resource.

In yet another embodiment, the invention provides a machine-accessible medium containing instructions for managing a resource managed by an mbean server application having an mbean, which when executed by a machine, cause the machine to perform operations. The instructions generally include operations for receiving a request by the mbean server application, wherein the request comprises an action a user seeks to perform on the resource, and operations for adding a number of instance identifier fields to an mbean descriptor file associated with the mbean. Further, the instructions include operations for populating the number of instance identifier fields with an equivalent number of properties from an objectname of the resource, thereby producing a populated mbean descriptor file that identifies the resource among resources. Further still, the instructions include operations for reading the populated mbean descriptor file, and for determining, based on the performed operations for reading, whether the user has an authority to perform the request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for managing a resource by an mbean application server having an mbean are contemplated. Embodiments include a Java™ application server environment, wherein a user has access, through, for example, verification of a user identifier and password, from a web browser application on a user's computer system or PDA, for example, to an mbean server application having an mbean for management of resources within a cell. Recognizing a cell as a collection, for whatever reason, of certain resources, then within the cell resides resources, which optionally include, for example, smaller cells, nodes (i.e., computer systems), servers, applications, and clusters, which are collections of application servers.

Verification of user identifier and password, however, merely provides coarse-grain authorization to the resources accessible through the application permitting management of the resources. Additional security constraints on a cell's resources, however, may restrict a user's actions to some or all of the resources in the cell. Implementation of such additional security or authorization requirements is called fine-grained authorization, which may result, for example, by using role and/or policy-based access control techniques with or without including hierarchical resource considerations.

After a user accesses the mbean server application through a set of JMX™ APIs, from, for example, a computer system or PDA, the mbean server application receives a request via a network connection, wherein the request represents an action a user seeks to perform on a particular resource. Generally speaking, the requested action is possible through invocation of an mbean method associated with an mbean having a type matching that of the requested resource, i.e., the resource upon which the user seeks to perform the requested action. Before actual invocation of the mbean method, however, pre-invocation occurs, and only after determining that a user has authority to perform the requested action does actual invocation of an mbean method occur.

In the pre-invocation, the identity of the requested resource is determined. In order to determine an identity, every resource is already configured with an objectname, which contains values assigned to keys, i.e., properties, for a resource. For example, keys may be domain, cell, name, type, node, and process. And, corresponding values assigned to these keys may be WebSpher, IBM-MC5528BBCHENetwork, AppManagement, AppManagement, IBM-MC5528BBCHEManager, and dmgr, respectively. By reading the mbean descriptor file, typically, a static, stored xml file for an mbean type, and adding instance identifier fields to a copy of the read mbean descriptor file at run time, then populating the instance identifier fields with values obtained from a particular resource's objectname yields a singular identity to the requested resource among resources having the same type as the associated mbean type. Afterwards, authority for the user's request on the now, identified resource is determined. If the user does not have authority to perform the requested action, then the mbean method is not invoked, and the requested action is denied. However, if the authorization check shows that the user does possess authority to perform the requested action on the identified resource, then the pre-invocation yields to invoking the actual mbean method to perform the requested action. Thereafter, actual invocation of the mbean method may produce results that perform actions on the requested resource and other resources to which the user does have the required authority to perform. For example, invocation of an mbean method to monitor nodes may result in the mbean method for nodes to show the log files for all nodes within the cell. Therefore, in line with the purpose of fine-grain authorization, a post-invocation occurs for filtering the results before returning the results to the user's request. The filtering involves determining the user's authority associated with the results, and returning only the results to which the user has authority.

Figure 1:
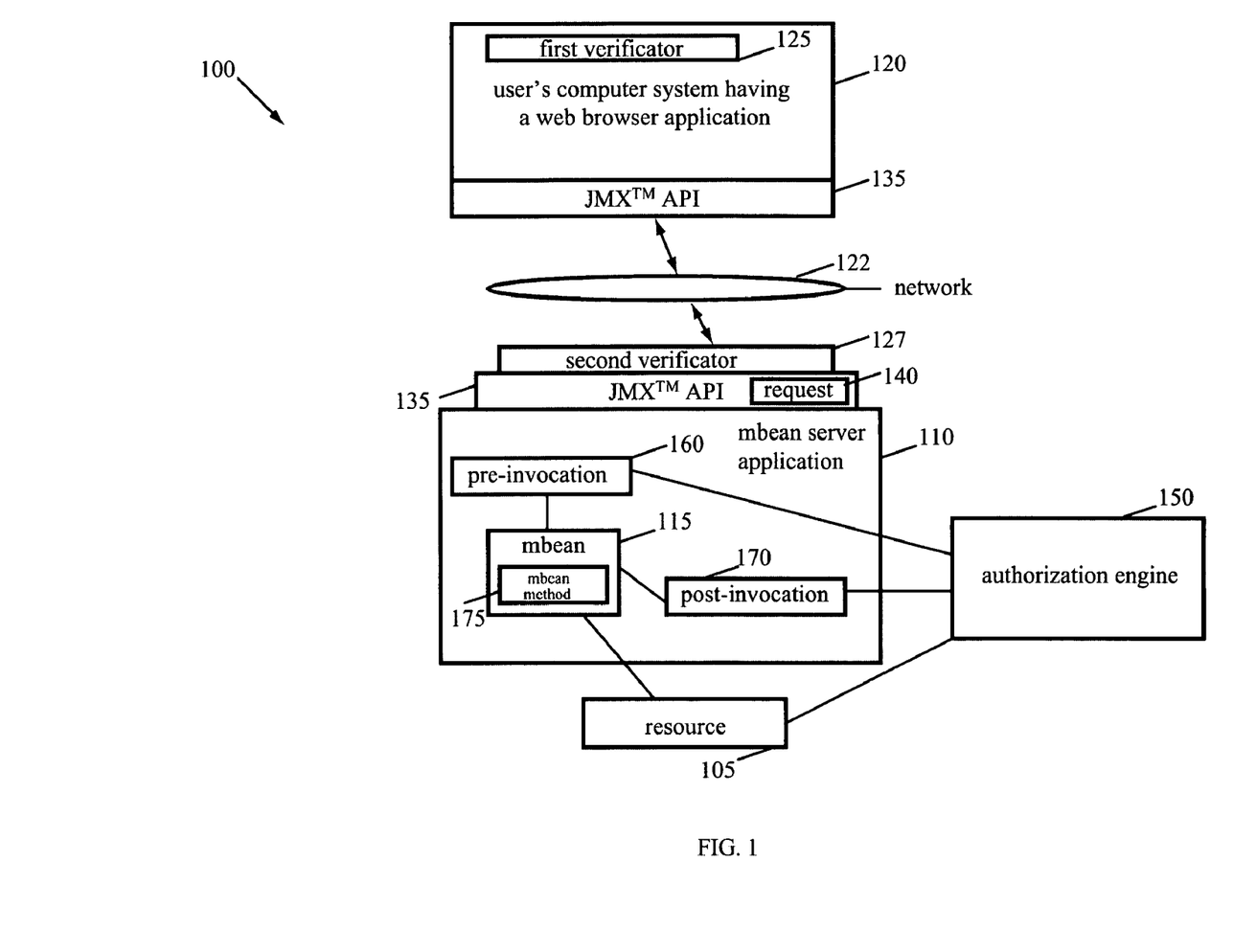
FIG. 1 depicts a system for managing a resource managed by an mbean server application having an mbean in accordance with the disclosed invention.

Turning now to the drawings, FIG. 1 depicts an embodiment of a system 100 for managing a resource 105 by an mbean server application 110 having an mbean 115. FIG. 1 depicts a user's computer system having a web browser application 120, which is on, for example, a stand-alone computer, one in a number of networked computers, or a PDA in communication through a network connection 122 to an mbean server application 110 associated with a an overall application management server system.

Before accessing mbean server application 110, the system 100 depicts a first verificator 125 on the user's computer system 120 and an optional, second verificator 127 associated with the mbean server application 110. The first verificator 125 requires the user to enter identifying information, such as a user identifier and a password, which is verified by logic associated with the user's computer system 120 to determine whether to grant access to the user's computer system 120. The optional, second verificator 127 functions in much the same way as the first verificator 125. That is, the second verificator 127 requires the user to enter identifying information, which may be the same or different from the identifying information used for accessing the user's computer system 120, and after verification by logic associated with the second verificator 127, the user has access to the mbean server application 110.

Once access to the mbean server application 110 exists, the system 100 further includes JMX™ APIs 135 in association with both the user's computer system having a web browser application 120 and the mbean server application 10 to receive a request 140 for an action on a resource 105. The JMX™ APIs 135 have standard specifications to allow for the passing of the user's request 150 to the mbean server application 110, wherein the request 140 contains the user's requested action seeking to be performed on a particular resource, that is, the requested resource, such as resource 105. For example, the request 140 may state, "tune server 17." Upon receipt of the request 140 by the mbean server application 110, logic embedded within the mbean, having the same type as the resource, may permit the requested action, as later discussion explains whether this requested action is to occur.

Rather than require an mbean 115 for each resource, the system 100 includes an mbean 115 for each type of resource. That is, within the system 100, there is one mbean 115 for all servers, another mbean 115 for all nodes, still another mbean 115 for clusters, and so forth. By avoiding a one-to-one correspondence between mbeans and resources instances, a corresponding avoidance of mbean methods for resource instances results, and, thereby, drastic reductions in scalability also result. Before invoking an mbean method 175 by the mbean 115 type on a requested resource of the same type, the system 100 includes a pre-invocation 160 enabled by software and/or hardware associated with the mbean server application 110. In the pre-invocation 160, the identity of the requested resource is determined. In order to determine an identity, every resource in the cell of resources is already configured with an objectname, which contains values assigned to keys, i.e., properties, for a resource.

By logic associated with the mbean server application 110, the pre-invocation 160 reads the mbean descriptor file, typically, a static, stored xml file for the mbean 115 type matching the type of resource in the user's request 140. By still more logic associated with the mbean server application 110, the pre-invocation 160 adds instance identifier fields to a copy of the read mbean descriptor file at run time, and then populates the instance identifier fields with values obtained from a requested resource's objectname, which results in providing the requested resource with a singular identity among resources having the same type as the associated mbean 115 type.

After the resource of the request 140 has an identity through the pre-invocation 160 logic in the system 100 calls an authorization engine 150 to determine whether the user has the required authority to perform the action on the requested resource. The authorization engine 150 may include, for example, roles and/or policies that optionally make use of hierarchical relationships among resources to determine whether a user has the authority to perform the requested action in the user's request 140.

If the user does not have authority to perform the requested action in the user's request 140, then the system 100 never progresses from the pre-invocation 160 to invocation of an mbean method 175 for performing the requested action on the resource. On the other hand, if the authorization engine 150 shows that the user does possess authority to perform the requested action on the now, identified resource, then the pre-invocation 160 yields to invoking the actual mbean method 175 to perform the requested action.

After actual invocation of the mbean method 175, the mbean method 175 may perform other actions on the same or other resources in the request, that is, collateral actions on collateral resources, and collectively termed "results," that a user may not have the authority for acting or on which to act. As a result, the system 100 further includes logic, enabled by software and/or hardware associated with the mbean server application 110, for a post-invocation 170, whereby a post-invocation 170 makes a call to the authorization engine 150 to determine the user's authority in relation to the results. Logic associated with the post-invocation 170 then returns only the results to the user for which authority exists. In short, logic associated with the post-invocation 170 filters the results based on a user's granted authority.

Figure 2:
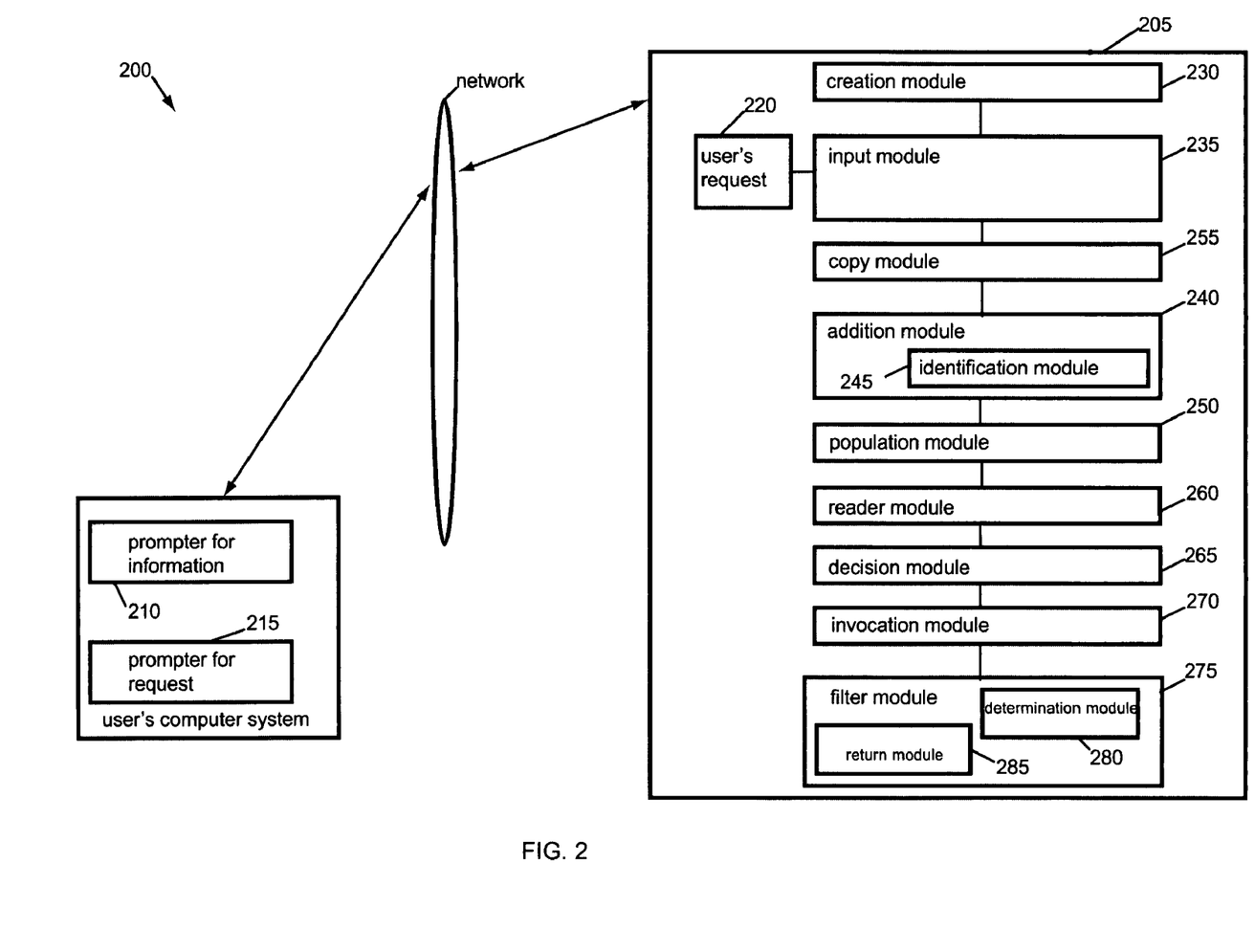
FIG. 2 depicts an example embodiment of a system managing a resource managed by an mbean server application having an mbean in accordance with the disclosed invention.

Turning now to FIG. 2, an example embodiment of another system 200 for managing a resource by an mbean server application having an mbean is disclosed. In the system 200, a user's request 220 is received by an application management server system 205 that includes an mbean server application in association with one or more application(s) for managing resources. FIG. 2 depicts a user's computer system, which includes a web browser application, launched, for example, from a stand-alone computer, one in a number of networked computers, or a PDA in communication through a network connection to application management server system 205 that includes an mbean server application. By logic enabled through software and/or hardware, the user's computer system further includes an optional prompter 215 for the request 215 containing the requested action the user seeks to perform on a requested resource for possible management by the system 200. In addition, the user's computer system further includes a prompter 210 for information, wherein the information for prompting is a user identifier and password, for instance, which is verified to ensure that the user has access to log on to the user's computer system and the application management server system 205 that includes an mbean server application.

After accessing the application management server system 205 having an mbean server application, the system 200, through a set of JMX™ APIs, an input module 235, enabled by coded logic in software and/or hardware, receives the user's request 235. Before using the system, however, a creation module, also enabled by software and/or hardware, is used to create objectnames for each of the resources managed by the management server system 205 having an mbean server application. An objectname is a set of properties for a particular resource, and takes the form of values assigned to keys such as version, name, mbean identifier, type, and node. The system 200 is already configured by, for example, an administrator having authority to manage the cell's resources before implementing the system 200.

After the input module 235 receives the user's request 220, and breaks down the user's request into requested action and requested resource type, another of the system's 200 modules operates to begin the series in a collection of modules, wherein the collection comprises a pre-invocation of an mbean method. That is, the system's 200 addition module 240 works in tandem with the population module 250, copy module 255, all of which are enabled through logic coded in software and/or reduced to processor(s), to create and add instance identifier fields to a copied mbean descriptor file, typically, a static, stored xml file for an mbean type matching the type of the requested resource. The copying occurs at run time, that is, upon processing of a user's request 220. The added instance identifier fields are then populated with values obtained from a particular resource's objectname to yield a singular identity to the requested resource among resources having the same type as the associated mbean type. By logic associated with the system's addition module 240, an optional, identification module 245 determines how many instance identifier fields are necessary for adding to the copied mbean type's descriptor file in order to provide a unique identity to the corresponding type of requested resource. Otherwise, the system 200 may already be configured so that the addition module automatically adds a fixed number of instance identifier fields to the copied mbean type's descriptor file. In such a configuration, the configurator has already determined how many instance identifier fields are necessary to add to the copied mbean type's descriptor file to yield a unique identity to each instance of a resource type on which a user may request an action.

After processing the system 200 through the reader module 260, which reads the populated, mbean descriptor file now identifying the requested resource, logic associated with the reader module 260 results in passing the identified, requested resource to a decision module 265, which calls an authorization engine to determine whether to grant the user's requested action on the requested resource. If the decision module 265 results in denying the user's request 220, that is, for example, the user does not have a permitted role to perform the requested action on the requested resource, then the fine-grained authorization system 200 denies the user access, and the mbean method to perform the requested action is never invoked. However, if the decision module 265 results in granting the user's request 220, that is, for example, the user does have a permitted role based on a grandparent resource constraining the requested resource, for instance, then perform of the requested action occurs by logic passed from the decision module 265 to the invocation module 270, which invokes the mbean method for performing the action on the requested resource. For example, if the user has authority to perform the requested action on a requested resource, say, a server, then the invoked mbean type would be a server mbean, which has a server mbean method for performing the requested action, such as tuning a server.

After the invocation module 270 invokes the requested resource's type of mbean to perform an mbean method, the results flowing from such mbean method may be greater than the user's authority. As a result, the system further includes a filter module 275. Enabled by software and/or hardware, the filter module 275 includes both a determination module 280 and a return module 285 that perform the necessary post-invocation processes in order to maintain the integrity of the fine-grained authorization system 200. The determination module 280, through associated logic, calls an authorization engine to determine the authority of the user in relation to the results emanating from invocation of the mbean method. The determination module 280 passes the gleaned authority versus results information to the return module 285, which then removes the results not based on actions and/or resources of the user's request 220.

Figure 3:
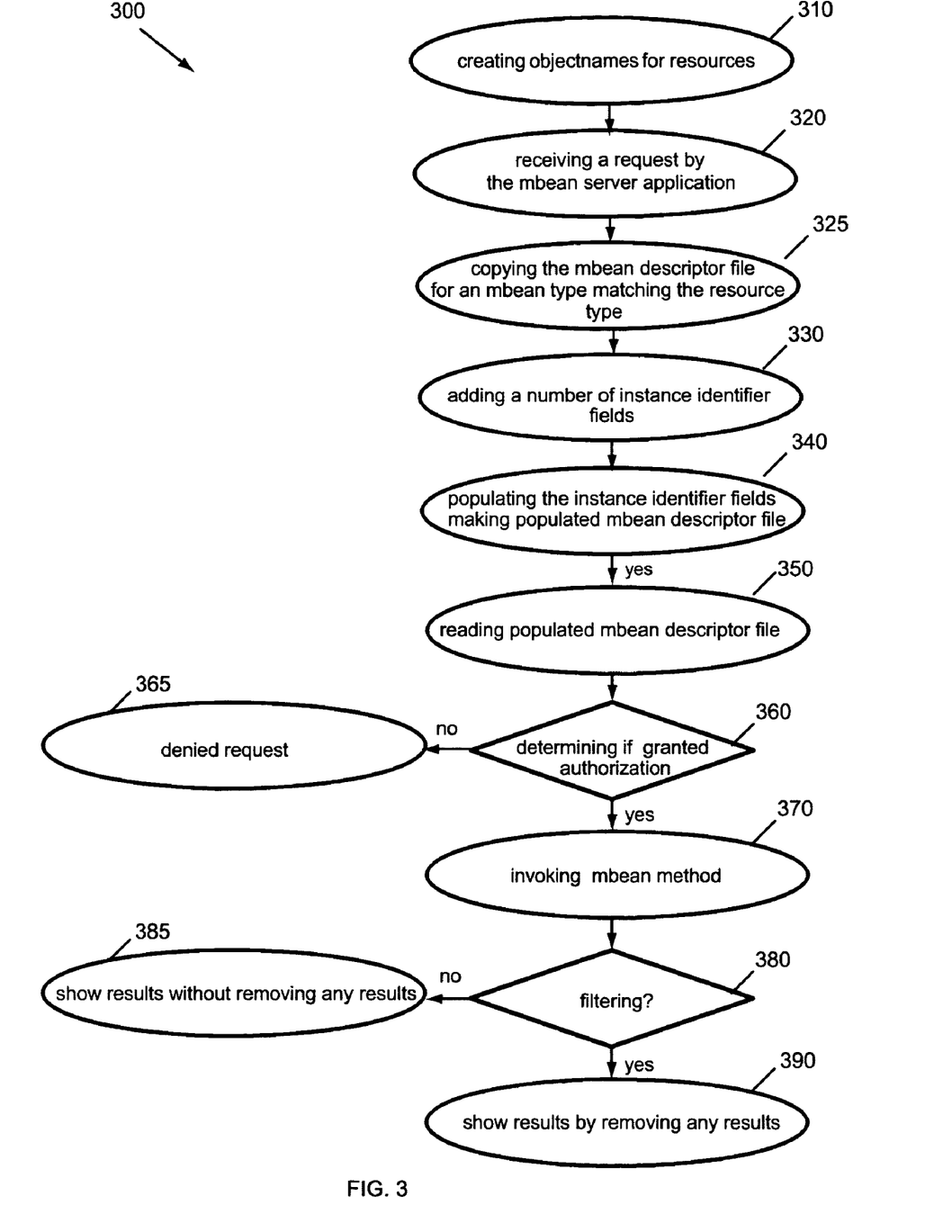
FIG. 3 depicts an example embodiment of a method for managing a resource managed by an mbean server application having an mbean in accordance with the disclosed invention.

Turning now to FIG. 3, another aspect of the invention is disclosed. In particular, an embodiment of a flowchart 300 for managing a resource by an mbean application server having an mbean is disclosed. Flowchart 300 is for a system, such as systems 100 and 200, as shown in FIG. 1 and FIG. 2.

Flowchart 300 begins by creating 310, enabled through software and/or hardware, objectnames for each of the resources managed by the management server system having an mbean server application. An objectname is a set of properties for a particular resource, and takes the form of values assigned to keys such as version, name, mbean identifier, type, and node. Typically, a cell administrator or similarly empowered authority configures a cell's resources before implementing a method for a system, such as systems 100 and 200, as shown in FIG. 1 and FIG. 2.

The flowchart 300 continues by an mbean server application receiving 320 a user's request constituting a request to perform an action on a resource, i.e., a requested action on a requested resource. An mbean server application may receive 320 the request, through a set of JMX™ APIs, from a user's computer system, which includes a web browser application, launched, for example, from a stand-alone computer, one in a number of networked computers, or a PDA in communication through a network connection to the mbean server application. As a component of receiving 320 the request, the user's computer system, as well as the mbean server application likely includes prompting for a user to enter security information to log onto the user's computer system, as well as the mbean server application. These promptings may use the same or a different user identifier and password, for example, and upon verification, the user has access to the mbean server application.

Moving down the flowchart 300, discussion of what is collectively termed the pre-invocation mbean method part of the flowchart 300 ensues. After receiving 320 the request, the flowchart 300 continues, through logic in software or hardware associated with the mbean server application, for copying 325 the descriptor file, likely stored in memory, of the mbean type matching the type of the requested resource. After copying 325 the mbean descriptor file at run time, the flowchart 300 continues by adding 330 a number of instance identifier fields to the copies mbean descriptor file, and populating 340 of the same number of instance identifier fields with values obtained from keys in the requested resource's objectname to yield a singular identity to the requested resource among resources having the same type as the associated mbean type. Further logic associated with the mbean server application may identify how many instance identifier fields are necessary for adding 330 to the copied mbean type's descriptor file in order to provide a unique identity to the corresponding type of requested resource. Otherwise, configuring to adding 330 a fixed number of instance identifier fields to the copied mbean type's descriptor file may occur before implementation of the flowchart 300 on a system such as FIG. 1 or FIG. 2. In such a configuration, the configurator has already determined how many instance identifier fields are necessary to add to the copied mbean type's descriptor file to yield a unique identity to each instance of a resource type on which a user may request an action.

Thorough associated logic, the flowchart 300 continues by reading 350 the now-identified, requested resource, that is, by reading 350 the populated mbean descriptor file, by presenting a decision block 360 for determining whether the pre-invocation part of the flowchart 300 culminates in denying 365 the request or continues by invoking 370 the mbean method to perform the requested action on the identified, requested resource by an mbean having the same type as the requested resource's type. For determining 370 whether to grant the user's request, logic associated with the mbean server application calls an authorization engine. If checking of the authorization engine results in denying 365 the user's request, that is, for example, the user does not have a permitted role to perform the requested action on the requested resource, then the flowchart 300 terminates, and the mbean method to perform the requested action is never invoked. However, if the authorization engine indicates that the user's request is granted, then logic passes for invoking 370 the mbean method for performing the action on the requested resource. For example, if the user has authority to perform the requested action on a requested resource, say, a cluster, then the invoked mbean type would be a cluster mbean, which has a cluster mbean method for performing the requested action, such as tuning a cluster.

After invoking 370 the mbean method to perform the granted request, that is the user has authority for performance of the requested action on the requested resource, the post-invocation part of the flowchart 300 begins and ends with a decision block for filtering 380. The results flowing from invoking 370 mbean method may be greater than the user's authority. As a result, the decision whether filtering 380 is necessary occurs. Enabled by software and/or hardware, the filtering 380 occurs by comparing the results from invoking 380 the mbean method to another call to the authorization engine to determine the authority of the user in relation to the results. If the results contains only authorized actions and/or resources as compared to the request, then filtering does not occur, and the results are shown without removing any results 385. However, if the authorization check indicates that the results contain unauthorized actions and/or resources as compared to the request, then in keeping with the fine-grained authorization purpose, all unauthorized results are removed 390 by logic associated with the mbean server application.

Figure 4:
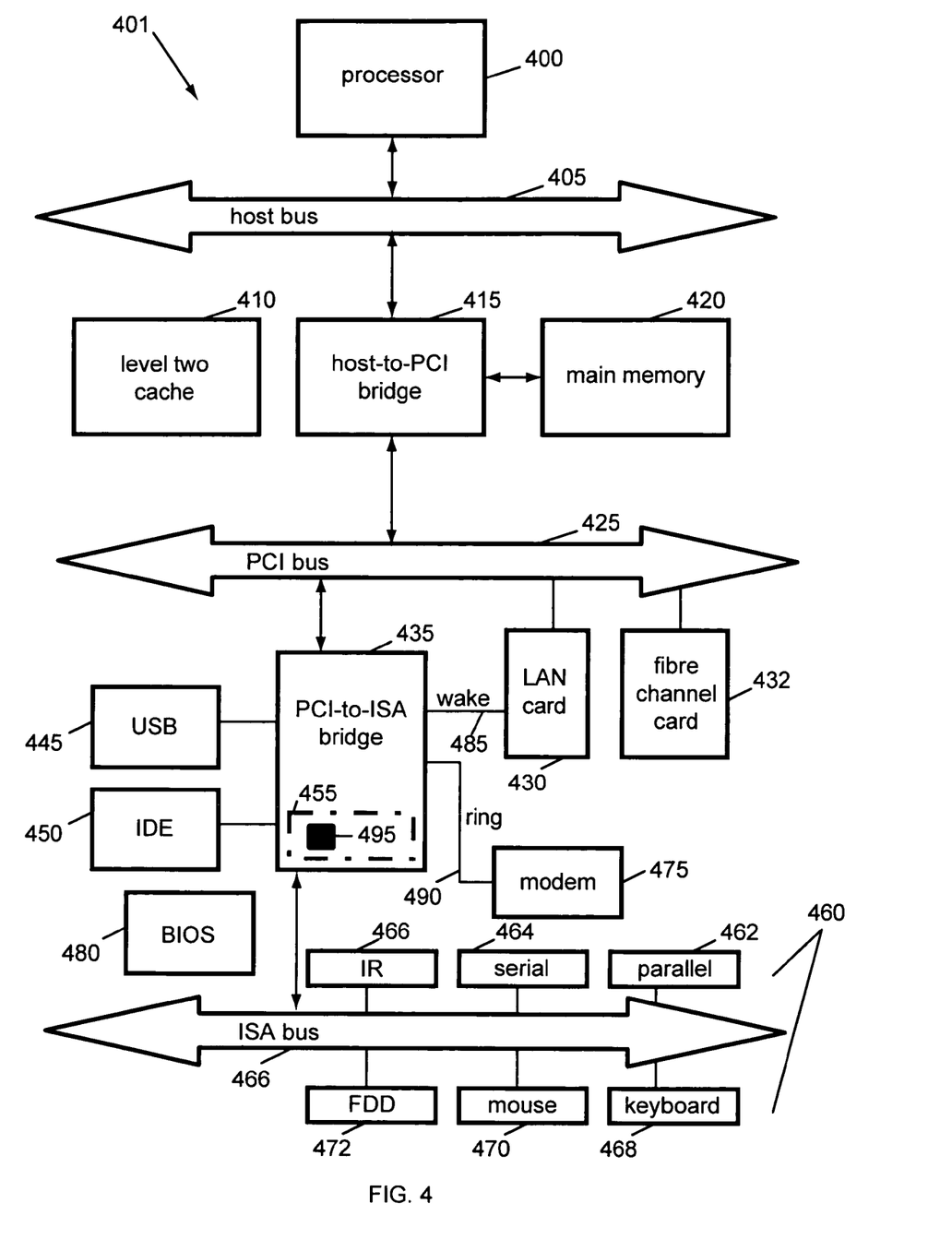
FIG. 4 illustrates an information handling system which is a simplified example of a computer system capable of performing the operations in accordance with the disclosed invention.

FIG. 4 illustrates information handling system 401 which is a simplified example of a computer system capable of performing the operations described herein. Computer system 401 includes processor 400 which is coupled to host bus 405. A level two (L2) cache memory 510 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. PCI bus 425 provides an interface for a variety of devices including, for example, LAN card 430. PCI-to-ISA bridge 435 provides bus control to handle transfers between PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, fixed disk (HDD) 472, removable storage device 474) coupled to ISA bus 440. Alternatively, many I/O devices can be accommodated by a super I/O controller (not shown) attached to ISA bus 440.

BIOS 480 is coupled to ISA bus 440, and incorporates the necessary processor executable code for a variety of low-level system functions and system boot functions. BIOS 480 can be stored in any computer readable medium, including magnetic storage media, optical storage media, flash memory, random access memory, read only memory, and communications media conveying signals encoding the instructions (e.g., signals from a network). In order to attach computer system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

Another embodiment of the invention is implemented as a program product for use with a computer system such as, for example, the system 100 shown in FIG. 1, and the system 200 shown in FIG. 2. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for managing a resource by an mbean server application having an mbean, the method comprising:
   receiving a request by the mbean server application, wherein the request comprises an action a user seeks to perform on the resource;
   adding a number of instance identifier fields to an mbean descriptor file associated with the mbean;
   populating the number of instance identifier fields with an equivalent number of properties from an objectname of the resource, thereby producing a populated mbean descriptor file that identifies the resource among resources;
   reading the populated mbean descriptor file;
   determining, based on the reading, whether the user has an authority to perform the request; and
   granting the request, based on the determining, to act on the resource if the user has the authority.

2. The method of claim 1, further comprising creating the objectname for the resource before implementing the method.

3. The method of claim 1, further comprises copying the mbean descriptor file before the adding.

4. The method of claim 1, further comprising identifying the number of instance identifier fields necessary for distinguishing a type of the resource from all other resources having the type.

5. The method of claim 1, further comprising invoking an mbean method for performing the request after the determining indicates the user has the authority for performing the request.

6. The method of claim 5, further comprising filtering results obtained by the invoking, wherein the filtering comprises:
   determining the authority associated with the results for the user; and
   returning the results for which the user has the authority.

7. The method of claim 1, wherein the mbean comprises a type identical to the type of the resource.

8. A system for managing a resource by an mbean server application having an mbean, the system comprising:
   an input module for receiving a request from a user in order to perform an action on a resource;
   an addition module for adding a number of instance identifier fields to an mbean descriptor file associated with the mbean;
   a population module for populating the number of instance identifier fields with an equivalent number of properties from an objectname of the resource, thereby producing a populated mbean descriptor file that identifies the resource among resources;
   a reader module for reading the populated mbean descriptor file; and
   a decision module for determining whether the user has an authority for performance of the action on the resource and for granting the request to act on the resource if the user has the authority.

9. The system of claim 8, further comprising a creation module for creating the objectname for the resource before implementing the method.

10. The system of claim 8, further comprising a copy module for copying the mbean descriptor file before processing by the adder module.

11. The system of claim 8, further comprising an identification module for identifying the number of instance identifier fields necessary for distinguishing a type of the resource from all other resources having the type.

12. The system of claim 8, further comprising an invocation module for invoking an mbean method for performing the request after processing by the decision module indicates the user has the authority for performance of the request.

13. The system of claim 12, further comprising a filter module for filtering results obtained by the invocation module, wherein the filter module comprises:
   a determination module for determining the authority associated with the results for the user; and
   a return module for returning the results for which the user has the authority.

14. The system of claim 8, wherein the mbean comprises a type identical to the type of the resource.

15. A computer-readable storage medium containing instructions, which when executed by a machine, cause the machine to perform operations for managing a resource by an mbean server application having an mbean, comprising:
   receiving a request by the mbean server application, wherein the request comprises an action a user seeks to perform on the resource;
   adding a number of instance identifier fields to an mbean descriptor file associated with the mbean;
   populating the number of instance identifier fields with an equivalent number of properties from an objectname of the resource, thereby producing a populated mbean descriptor file that identifies the resource among resources;
   reading the mbean descriptor file after the populating;
   determining, based on the performed operations for reading, whether the user has an authority to perform the request;
   granting the request, based on the determining, to act on the resource if the user has the authority.

16. The computer-readable storage medium of claim 15, further comprising instructions to perform operations for creating the objectname for the resource before implementing the method.

17. The computer-readable storage medium of claim 15, further comprising instructions to perform operations for copying the mbean descriptor file before the adding.

18. The computer-readable storage medium of claim 15, further comprising instructions to perform operations for identifying the number of instance identifier fields necessary for distinguishing a type of the resource from all other resources having the type.

19. The computer-readable storage medium of claim 15, further comprising instructions to perform operations for invoking an mbean method for performing the request after the performed operations for determining indicates the user has the authority for performing the request.

20. The computer-readable storage medium of claim 15, further comprising instructions to perform operations for filtering results obtained by the performed operations for invoking, the instructions to perform operations for filtering comprising:
   determining the authority associated with the results for the user; and
   returning the results for which the user has the authority.

* * * * *